(12) United States Patent
Han et al.

(10) Patent No.: US 12,105,116 B2
(45) Date of Patent: Oct. 1, 2024

(54) DISPOSABLE FLOW VELOCITY MEASURING DEVICE HAVING PREDETERMINED SENSITIVITY TO PRESSURE CHANGE BY USING VARIOUS TYPES OF ULTRA-THIN FILMS

(71) Applicant: INJE UNIVERSITY INDUSTRY-ACADEMIC COOPERATION FOUNDATION, Gimhae-si (KR)

(72) Inventors: Ki-Ho Han, Busan (KR); Hyung-Seok Cho, Busan (KR); Jin-Ho Kim, Busan (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 782 days.

(21) Appl. No.: 17/144,301

(22) Filed: Jan. 8, 2021

(65) Prior Publication Data

US 2021/0123941 A1    Apr. 29, 2021

Related U.S. Application Data

(63) Continuation of application No. PCT/KR2019/011810, filed on Sep. 11, 2019.

(30) Foreign Application Priority Data

Sep. 13, 2018  (KR) .......................... 10-2018-0109380
Jan. 2, 2019   (KR) .......................... 10-2019-0000378

(51) Int. Cl.
*G01P 5/12*  (2006.01)
*B01L 3/00*  (2006.01)
*G01F 1/692* (2006.01)

(52) U.S. Cl.
CPC .......... *G01P 5/12* (2013.01); *B01L 3/502707* (2013.01); *B01L 3/502746* (2013.01);
(Continued)

(58) Field of Classification Search
None
See application file for complete search history.

(56) References Cited

U.S. PATENT DOCUMENTS

| 2013/0129578 A1* | 5/2013 | Jeong | ................. G01N 15/1484 422/255 |
| 2020/0033376 A1* | 1/2020 | Han | ...................... G01F 1/6847 |
| 2021/0402393 A1* | 12/2021 | Han | ...................... G01F 1/6845 |

FOREIGN PATENT DOCUMENTS

| JP | 3918040 B2 | 5/2007 |
| JP | 2007-212199 A | 8/2007 |

(Continued)

OTHER PUBLICATIONS

Hamed Gholami Derami, et al., "Experimental and Computational Study of Gas Bubble Removal in a Microfluidic System Using Nanofibrous Membranes", SIUE Faculty Research, Scholarship, and Creative Activity, Jun. 18, 2016, pp. 1-32.
(Continued)

*Primary Examiner* — Jonathan M Dunlap
(74) *Attorney, Agent, or Firm* — Sughrue Mion, PLLC

(57) ABSTRACT

A disposable flow velocity measuring device including: a first panel having a flow velocity measuring structure, and having additional micro protrusion patterns formed around the flow velocity measuring structure; a second panel separated from the first panel, and including a fluid channel through which a sample passes; a porous ultra-thin film formed on a portion, at which the first panel and the second panel come in contact with each other, so that the sample passing through the fluid channel does not directly come in contact with the flow velocity measuring structure, thereby (Continued)

separating the first panel and the second panel and removing micro-air bubbles included in the fluid passing through the fluid channel; a non-porous ultra-thin film formed in a partial region of the porous ultra-thin film; and a negative pressure forming unit for applying negative pressure in order to adsorb the first panel and the second panel.

12 Claims, 12 Drawing Sheets

(52) U.S. Cl.
CPC ........ *G01F 1/692* (2013.01); *B01L 3/502723* (2013.01); *B01L 2200/0684* (2013.01); *B01L 2200/12* (2013.01); *B01L 2300/0645* (2013.01); *B01L 2300/0681* (2013.01); *B01L 2300/0816* (2013.01); *B01L 2300/0887* (2013.01); *B01L 2300/123* (2013.01); *B01L 2300/165* (2013.01); *B01L 2300/1827* (2013.01); *B01L 2400/049* (2013.01); *B01L 2400/086* (2013.01)

(56) References Cited

FOREIGN PATENT DOCUMENTS

| KR | 10-2016-0007934 A | 1/2016 | |
|---|---|---|---|
| KR | 101852719 B1 * | 4/2018 | ........... G01F 1/6847 |

OTHER PUBLICATIONS

International Search Report for PCT/KR2019/011810 dated Jan. 15, 2020 (PCT/ISA/210).

* cited by examiner

DISPOSABLE FLOW VELOCITY MEASURING DEVICE HAVING PREDETERMINED SENSITIVITY TO PRESSURE CHANGE BY USING VARIOUS TYPES OF ULTRA-THIN FILMS

CROSS-REFERENCE TO RELATED APPLICATIONS

This application is a Continuation of PCT International Application No. PCT/KR2019/011810 filed on Sep. 11, 2019, which claims priority under 35 U.S.C. § 119(a) to Korean Patent Application No. 10-2018-0109380 filed on Sep. 13, 2018 and Korean Patent Application No. 10-2019-0000378 filed on Jan. 2, 2019, the entire disclosures of which are incorporated herein by reference.

TECHNICAL FIELD

The present invention relates to a disposable flow velocity measuring device with a structure which can be separated using various types of ultra-thin films.

Further, the present invention relates to a microfluidic device capable of removing micro bubbles inside a channel using a support pattern protruding from a porous ultra-thin film and a manufacturing method therefor.

BACKGROUND ART

Recently, a method for measuring a flow velocity of a fluid in a micro-fluid structure generally uses a structure in which measuring sensors are disposed at both ends and a heater is located therebetween.

A measurement principle thereof is that a fluid on a heater has a higher temperature than a fluid around the heater so that when the fluid does not flow, the fluids in channels of two measurement parts on both sides of the heater have the same temperature, but when fluid flows through the channel, a temperature measured by a temperature measurement sensor at the back of the heater and a temperature measured by a temperature measurement sensor in front of the heater are different, which causes a resistance difference of both measurement sensors by the temperature difference and is electrically measured to measure a flow velocity of the fluid.

In the related art technology, most fluid flow velocity measuring devices generally have an integrated structure in which a channel of the fluid, a heater, and a measurement sensor are manufactured in one structure.

For this reason, it is generally difficult to manufacture the fluid flow velocity measuring device and the fluid flow velocity measuring device is expensive. Specifically, when a biosample is used, the device cannot be reused and must be used only once and then discarded so that there is a serious problem of waste in terms of cost.

Among them, the micro-fluid flow velocity measuring device is too expensive to be discarded after one-time use.

Further, in the case of the fluid flow velocity measuring device which is currently being commercialized, a measurable range of the flow velocity may be limited depending on a cross-sectional area of a channel through which the fluid flows and a structure of a heater and a measurement unit which measure a flow velocity.

Accordingly, there is a disadvantage in that a flow velocity measurement range which is measurable for every fluid flow velocity measuring device is limited.

In the meantime, blockage of bubbles or air formed in a micro-channel in the microfluidic device may affect the performance degradation of the device.

For example, air bubbles trapped in a major channel part of a chip which performs various functions, such as a micro polymerized chain reaction (PCR), a chip-based cell culture, cell separation, particle separation, a micro-fluid pump, a micro-fluid mixer, or a fluid sensor, degrade a unique function of the chip and cause the efficiency degradation.

Accordingly, a function which discharges air bubbles introduced during the usage of the chip to the outside in real time is essentially requested.

DISCLOSURE

Technical Problem

An object of the present invention is to provide a disposable flow velocity measuring device which is capable of removing micro air bubbles generated in a fluid channel and stably maintaining a structure of the fluid channel even in a heat caused by a heater or an electrode of the flow velocity measuring device.

Further, an object of the present invention is to provide a disposable flow velocity measuring device which removes a residual space between a heater and a measurement electrode of the flow velocity measuring device and an ultra-thin film so that there is no space which is changed according to the pressure to have a constant sensitivity for flow velocity measurement and be stable.

Further, an object of the present invention is to provide a microfluidic device which discharges air bubbles flowing during the usage of the chip in the devices, such as sensor, separation, measurement, cell culture, and analysis based on a microfluidic technique, to the outside of the chip in real time to prevent the interruption of the flow of the fluid in the channel or the micro bubble from occupying a volume to be occupied by the fluid, to significantly improve the efficiency of a specific function such as analysis, separation, or measurement.

Further, an object of the present invention is to provide a manufacturing method for a microfluidic device which discharges air bubbles trapped in a major channel part of a chip which performs various functions, such as a micro polymerized chain reaction (PCR), a chip-based cell culture, cell separation, particle separation, a micro-fluid pump, a micro-fluid mixer, or a fluid sensor, in real time to improve a unique function and an efficiency of the chip.

Technical Solution

In order to achieve the above-described objects, the present invention provides a disposable flow velocity measuring device including: a first panel having a flow velocity measuring structure for measuring a flow velocity of fluid and having additional micro protrusion patterns around the flow velocity measuring structure; a second panel separated from the first panel and including a fluid channel through which a sample passes; a porous ultra-thin film formed on a portion at which the first panel and the second panel come in contact with each other so that the sample passing through the fluid channel does not directly come in contact with the flow velocity measuring structure, thereby separating the first panel and the second panel and removing micro air bubbles included in the fluid passing through the fluid channel; a non-porous ultra-thin film formed in a partial region of the porous ultra-thin film; and a negative pressure forming unit which applies a negative pressure to adsorb the first panel and the second panel.

Further, in order to achieve the above-described objects, the present invention provides an upper channel including a microfluidic channel through which fluid passes; a porous ultra-thin film which is attached on a lower surface of the microfluidic channel to be integrated with the upper panel and includes a support pattern protruding to remove micro bubbles included in fluid passing through the microfluidic channel in real time; a lower panel which is in contact with lower surfaces of the upper panel and the porous ultra-thin film; and a negative pressure forming unit which forms a negative pressure between the microfluidic channel to which the porous ultra-thin film is attached and the lower panel.

Advantageous Effects

As described above, according to the present invention, micro air bubbles generated in a fluid channel may be removed and a structure of the fluid channel may be stably maintained even in the heat due to the heater or the electrode of the flow velocity measuring device.

Further, a residual space between a heater and a measurement electrode of the flow velocity measuring device and an ultra-thin film is removed so that there is no space which is changed according to the pressure to provide a disposable flow velocity measuring device which has a constant sensitivity for flow velocity measurement and is stable.

Further, micro bubbles generated in a fluid channel of devices such as sensor, separation, measurement, cell culture, and analysis based on a microfluidic technique are removed to prevent the interruption of the flow of the fluid in the channel or the micro bubble from occupying a volume to be occupied by the fluid, to significantly improve the efficiency of a specific function such as analysis, separation, or measurement.

Further, the bubbles in the fluid are removed by the microfluidic device in real time to simultaneously remove the bubbles in the fluid and drive the device so that a separate device for removing the bubbles is not necessary, which is very advantageous in terms of the cost, as compared with the related art.

A structure which removes the bubbles in the fluid is simple to be easily manufactured and massively produced, thereby being widely used for various techniques.

MODES OF THE INVENTION

In order to achieve the above-described objects, the present invention provides a disposable flow velocity measuring device including: a first panel having a flow velocity measuring structure for measuring a flow velocity of fluid and having additional micro protrusion patterns around the flow velocity measuring structure; a second panel separated from the first panel and including a fluid channel through which a sample passes; a porous ultra-thin film formed on a portion at which the first panel and the second panel come in contact with each other so that the sample passing through the fluid channel does not directly come in contact with the flow velocity measuring structure, thereby separating the first panel and the second panel and removing micro air bubbles included in the fluid passing through the fluid channel; a non-porous ultra-thin film formed in a partial region of the porous ultra-thin film; and a negative pressure forming unit which applies a negative pressure to adsorb the first panel and the second panel.

Further, in order to achieve the above-described objects, the present invention provides an upper channel including a microfluidic channel through which fluid passes; a porous ultra-thin film which is attached on a lower surface of the microfluidic channel to be integrated with the upper panel and includes a support pattern protruding to remove micro bubbles included in fluid passing through the microfluidic channel in real time; a lower panel which is in contact with lower surfaces of the upper panel and the porous ultra-thin film; and a negative pressure forming unit which forms a negative pressure between the microfluidic channel to which the porous ultra-thin film is attached and the lower panel.

BEST MODE

Figure 1:
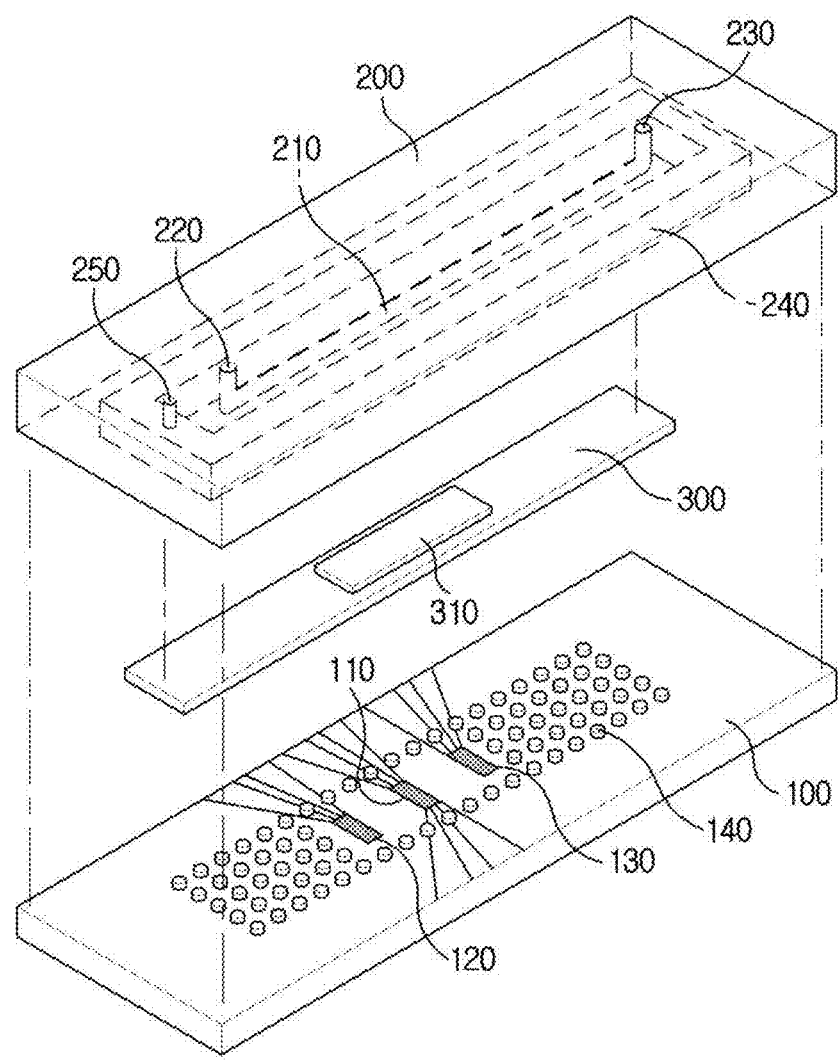
FIG. 1 is an exploded perspective view of a disposable flow velocity measuring device of the present invention.
Figure 2:
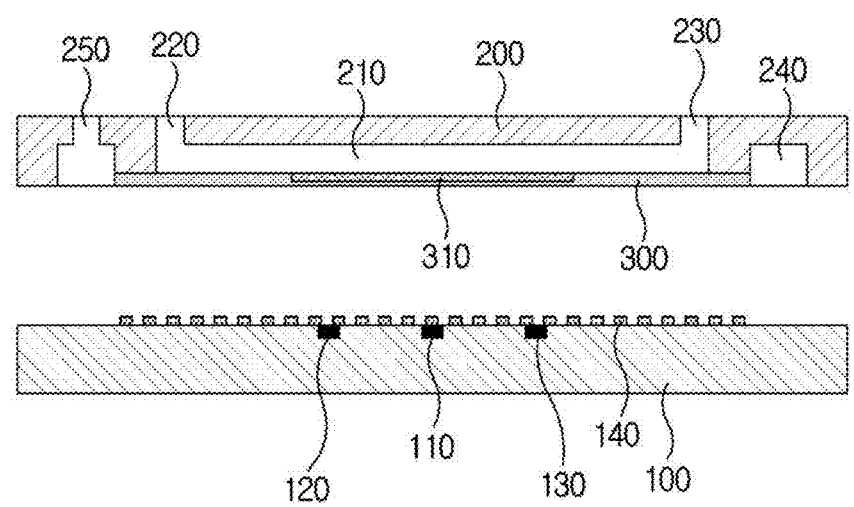
FIG. 2 is a cross-sectional view of a disposable flow velocity measuring device of the present invention illustrating a state in which a first panel and a second panel are separated.
Figure 3:
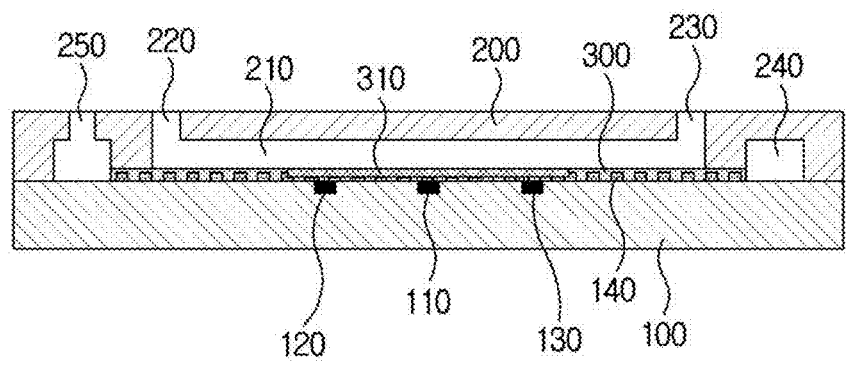
FIG. 3 is a combined cross-sectional view of a disposable flow velocity measuring device of the present invention.

FIG. 1 is an exploded perspective view of a disposable flow velocity measuring device of the present invention, FIG. 2 is a cross-sectional view of a disposable flow velocity measuring device of the present invention illustrating a state in which a first panel and a second panel are separated, and FIG. 3 is a combined cross-sectional view of a disposable flow velocity measuring device of the present invention.

A disposable flow velocity measuring device of the present invention includes a first panel 100 in which flow velocity measuring structures 110, 120, 130 for measuring a flow velocity of fluid are formed and a micro protrusion pattern 140 is added around the flow velocity measuring structures and a second panel 200 which is separated from the first panel 100 and includes a micro-fluid channel 210 through which a sample passes.

Further, a porous ultra-thin film 300 is formed at a portion at which the first panel 100 and the second panel 200 come in contact with each other so that the sample passing through the micro-fluid channel does not directly come in contact with the flow velocity measuring structures to separate the first panel 100 and the second panel and remove the micro air bubbles included in the fluid passing through the fluid channel.

Further, a non-porous ultra-thin film 310 which is formed in a partial region of the porous ultra-thin film 300 with a material different from the porous ultra-thin film and a negative pressure forming means which applies a negative pressure to adsorb the first panel 100 and the second panel 200 are provided.

As described above, according to the present invention, the first panel 100 for measuring a flow velocity of the fluid and the second panel 200 through which the sample passes are separately configured and the porous ultra-thin film 300 is configured at a portion at which the first panel 100 and the second panel 200 come in contact with each other so that it is advantageous in that the first panel 100 including the flow velocity measuring structure may be permanently used.

The flow velocity measuring structure installed in the first panel 100 includes a heater 110 which applies heat to the sample passing through the micro-fluid channel and two temperature measurement electrodes 120 and 130 which are installed in front and back of the heater 110 to measure a resistance difference according to the temperature change of the sample when the temperature of the sample rises by the heat generated from the heater 110.

That is, a first temperature measurement electrode 120 is installed at one side of the heater 110 and a second temperature measurement electrode 130 is installed at the other side of the heater 110 so that the temperature measurement electrodes are installed in front and back of the heater 110 in a direction where the sample flows. Therefore, when the temperature of the sample which passes through the micro-fluid channel 210 of the second panel 200 is increased due to the heat generated in the heater 110, the resistance difference according to the temperature change of the sample is measured.

In this case, various structures and shapes are applicable to the heater 110 and the temperature measurement electrodes 120 and 130 and as long as a configuration can measure a temperature of the sample, the configuration is not limited to the structure illustrated in the drawings of the present invention.

Here, the first panel 100 of the present invention has a micro protrusion pattern 140 formed around the flow velocity measuring structure.

The micro protrusion pattern 140 is formed with a height of several micrometers on a surface of the first panel 100 to form a space with several micrometers between the porous ultra-thin film 300 and the first panel 100 and provides a passage through which micro air bubbles passing through the porous ultra-thin film 300 are smoothly leaked to the outside through the space.

In this case, the micro protrusion pattern 140 is desirably formed to have a height of 3 to 7 μm and the micro protrusion patterns 140 may be integrally formed on the surface of the first panel 100 or formed by attaching a patterned ultra-thin film.

As a method for integrally forming the micro protrusion patterns 140 on the surface of the first panel 100, a known technique can be applied so that a detailed description thereof will be omitted.

In the meantime, the second panel 200 includes a micro-fluid channel through which the sample flows. The micro-fluid channel may be configured to include a fluid inlet 220 through which the sample is injected, a fluid channel 210 through which the sample flowing from the fluid inlet 220 flows, and a fluid outlet 230 through which the sample flowing through the fluid channel 210 is discharged.

In the embodiment of the present invention, the fluid inlet 220 and the fluid outlet 230 are formed to communicate with an upper surface of the second panel 200 and lower ends of the fluid inlet 220 and the fluid outlet 230 are connected by the fluid channel 210 so that the flow of the sample is performed with a shape of "U".

However, the position where the fluid inlet 220 and the fluid outlet 230 are formed is not limited thereto and in some cases, the fluid inlet 220 and the fluid outlet 230 may be formed to communicate with a side surface of the second panel 200.

The present invention has a structure in which the micro air bubbles included in the fluid which passes through the fluid channel may be leaked through the porous ultra-thin film 300.

The porous ultra-thin film 300 is attached onto a lower surface of the micro-fluid channel 210 to remove micro air bubbles included in the fluid which passes through the micro-fluid channel 210.

The porous ultra-thin film 300 has hydrophobicity so as not to pass the fluid flowing through the micro-fluid channel 210 but pass only the micro air bubbles included in the fluid to be leaked to the first panel 100.

That is, when the fluid passes on the porous ultra-thin film 300 while flowing through the micro-fluid channel 210, since the ultra-thin film 300 has hydrophobicity, the fluid flowing through the micro-fluid channel 210 flows as it is without being leaked through pores of the porous ultra-thin film 300.

In contrast, the micro air bubbles in the fluid are leaked through the pores of the porous ultra-thin film 300 having hydrophobicity.

In the present invention, the porous ultra-thin film 300 is formed of a hydrophobic material or may have hydrophobicity by processing the surface of the porous ultra-thin film 300 with a hydrophobic material.

As the porous ultra-thin film 300, various materials such as glass, polymer, or paper are applicable and for example, the porous ultra-thin film may include at least one material selected from the group consisting of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

In the present invention, polydimethyl siloxane (PDMS) is applied as the porous ultra-thin film 300.

The micro air bubbles leaked through the porous ultra-thin film 300 are gathered on the first panel 100 so that a passage needs to be prepared in the first panel 100 to discharge the micro air bubbles to the outside.

To this end, in the present invention, micro protrusion patterns 140 are formed to protrude on the surface of the first panel 100 with a predetermined interval.

In the meantime, in the present invention, a non-porous ultra-thin film 310 which is formed of a material different from that of the porous ultra-thin film is formed in a partial region of the porous ultra-thin film 300.

Here, the non-porous ultra-thin film 310 is located above the heater and two measurement electrodes. As described above, the non-porous ultra-thin film 310 is installed above the porous ultra-thin film 300 corresponding to the position of the flow velocity measuring structure so that a two-layered ultra-thin film is configured.

When the porous ultra-thin film 300 is located above the heater and two measurement electrodes, the porous ultra-thin film 300 expands by the heat of the heater to pass not only the air bubbles, but also the fluid, which causes the loss of the sample fluid injected through the fluid inlet. Therefore, in order to solve this problem, the non-porous ultra-thin film 310 may be formed of various materials having a property which prevents the air bubbles and the fluid from passing therethrough.

For example, the non-porous ultra-thin film may be formed of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

Unlike the porous ultra-thin film 300, the non-porous ultra-thin film 310 has a characteristic in that pores are not formed so that even though heat of the heater is applied, the non-porous ultra-thin film may completely prevent the air bubbles or fluid from passing through the ultra-thin film.

Desirably, the non-porous ultra-thin film 310 may be formed of a PET material.

Here, in the first panel 100 corresponding to the position of the non-porous ultra-thin film 310, the flow velocity measuring structure is provided, so that as illustrated in FIG. 1, the micro protrusion pattern 140 is omitted.

Further, the first panel 100 is installed to be in contact with the lower surfaces of the second panel 200 and the porous ultra-thin film 300, is attached to the micro-fluid channel 210 to which the porous ultra-thin film 300 is attached in a vacuum state, and includes a passage through which the micro air bubbles leaked through the porous ultra-thin film 300 is discharged to the outside.

In order to attach the micro-fluid channel 210 with the porous ultra-thin film 300 attached thereto and the first panel 100 in a vacuum state, in the present invention, a negative pressure forming unit which applies a vacuum is included.

Here, the negative pressure forming unit includes a negative pressure forming groove 240 formed on a lower surface of the second panel 200, a vacuum suction unit 250 which communicates with the negative pressure forming groove 240 to apply the vacuum to the negative pressure forming groove 240 to attach the micro-fluid channel 210 with the porous ultra-thin film 300 attached thereto to the first panel 100 in a vacuum state.

The negative pressure forming groove 240 is formed to enclose the micro-fluid channel 210 and the porous ultra-thin film 300.

That is, as illustrated in FIG. 1, the negative pressure forming groove 240 may be desirably formed with a quadrangular shape to include all the areas where the micro-fluid channel 210 and the porous ultra-thin film 300 are formed.

The vacuum suction unit 250 is formed such that both ends communicate with an upper surface or a side surface of the negative pressure forming groove 240 and the second panel 200 and is connected to an external device to apply the vacuum. Therefore, an air layer between the first panel 100 and the second panel 200 is completely removed so that the first panel 100 and the second panel 200 are vacuum-adsorbed.

In the present invention, it has been illustrated that the vacuum suction unit 250 is formed to communicate with the upper surface of the second panel 200 in FIGS. 1 to 3.

However, the present invention is not limited thereto and a structure in that the vacuum suction unit 250 communicates with the side surface of the second panel 200 to suck air in the negative pressure forming groove 240 through the vacuum suction unit 250 at the outside is also available.

With this structure, the first panel 100 and the channel 110 may be detachable by the negative pressure forming groove 240.

That is, when the vacuum is applied to the negative pressure forming groove 240, the first panel 100 and the channel 110 are attached by the vacuum and when the vacuum applied to the negative pressure forming groove 240 is released, the first panel 100 and the channel 110 are detached to be separated.

Figure 4:
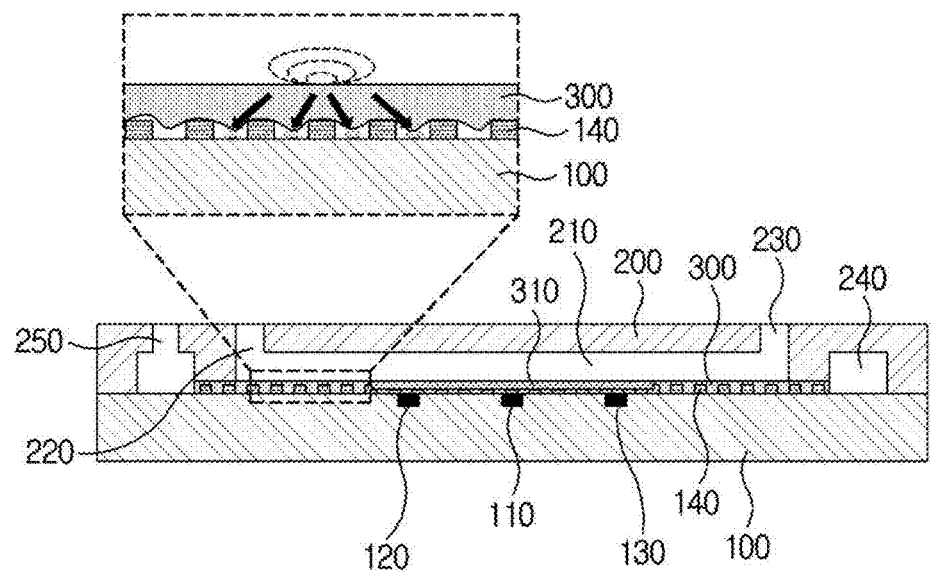
FIGS. 4 and 5 are enlarged cross-sectional views for explaining a function of a disposable flow velocity measuring device of the present invention.
Figure 5:
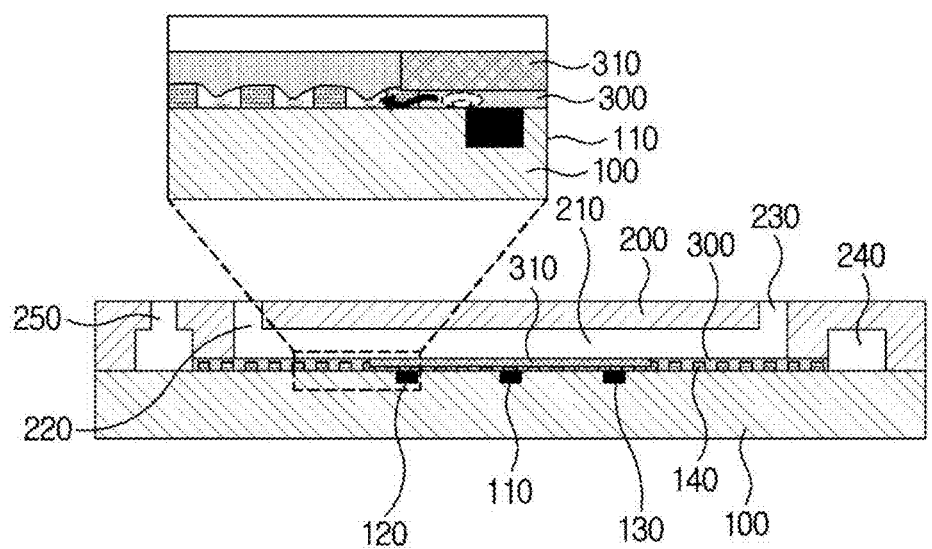
Figure 6:
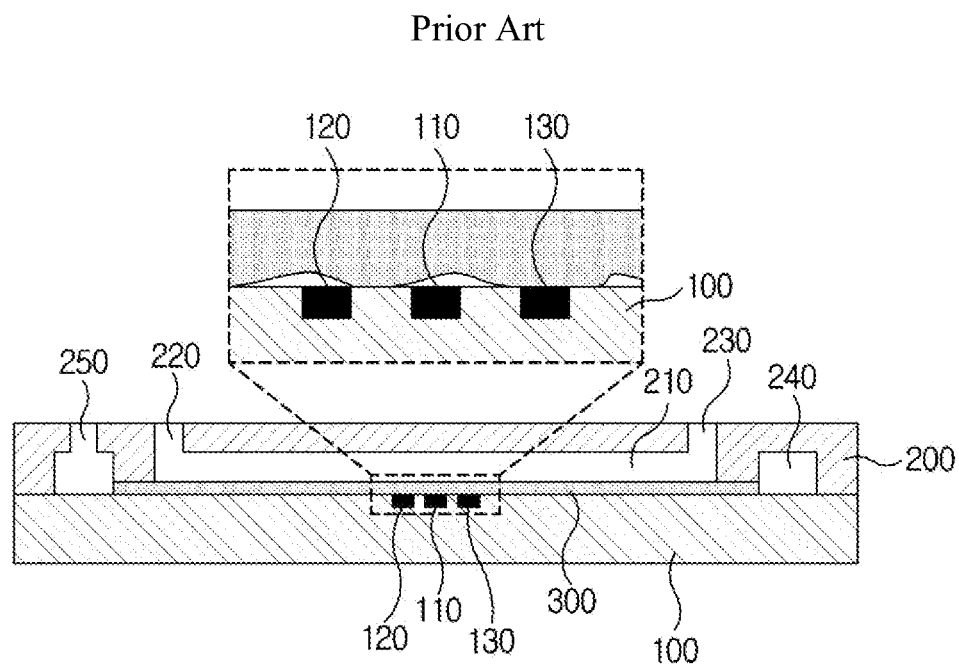
FIG. 6 is a cross-sectional view for explaining a problem of the related art.

FIGS. 4 and 5 are enlarged cross-sectional views for explaining a function of a disposable flow velocity measuring device of the present invention and FIG. 6 is a cross-sectional view for explaining a problem of the related art.

An operation and an effect of the present invention will be described with reference to the drawings.

The disposable flow velocity measuring device of the present invention basically has a structure in which the first panel 100 and the second panel 200 are separated by the ultra-thin film and the porous ultra-thin film 300 entirely configures the ultra-thin film.

The porous ultra-thin film 300 desirably uses a material of polydimethyl siloxane (PDMS) and the non-porous ultra-thin film 310 which is locally configured in a partial region of the porous ultra-thin film 300 in two layers is formed of a PET material.

As illustrated in FIG. 4, not only the fluid, but also the micro air bubbles 10 always remain in the fluid channel 210, and the air bubbles 10 interrupt the flow of the fluid or particles so that it is a very critical problem in the microscopic fluidic field.

When the micro protrusion pattern 140 formed on the first panel 100 and the porous ultra-thin film 300 formed in the second panel 200 are coupled using the negative pressure, as illustrated in the enlarged view of FIG. 4, the porous ultra-thin film 300 which is a soft material is slightly bent to be coupled between the micro protrusion patterns 140 at the time of coupling using the negative pressure.

However, a small space remains between the micro protrusion patterns 140 and thus when air bubbles remain in the fluid channel, the air bubbles 10 passes (arrow) through the porous ultra-thin film 300 by the force of the negative pressure to be leaked to the small space.

However, when this structure is formed in the heater 110 and two measurement electrodes 120 and 130, the porous ultra-thin film 300 expands more due to the heat of the heater 110.

The expanded porous ultra-thin film 300 passes not only the air, but also the fluid so that damages of the sample fluid injected through the fluid inlet may be caused.

Accordingly, in order to prevent the above-mentioned problem, in the present invention, only in the heater 110 and two measurement electrodes 120 and 130, a two-layered ultra-thin film is configured without providing the micro protrusion pattern 140.

As described above, in the present invention, even though the ultra-thin film is formed in two layers in a temperature measuring portion, as illustrated in FIG. 5, even though the micro protrusion pattern 140 is not provided in the first panel 100, air bubbles 10 generated when the first panel 100 and the second panel 200 are coupled using the negative pressure may be discharged to the side surface through the porous ultra-thin film 300 so that it does not affect the measurement sensitivity.

The biggest advantage of the present invention is that the sensitivity of the flow velocity measuring device measured at the measurement electrode does not vary depending on the intensity of the negative pressure for coupling the first panel 100 and the second panel 200.

In the related art, the first panel and the second panel are separated using a PET ultra-thin film which is a hard material so that when the negative pressure is applied to couple the first panel and the second panel, a small remaining space is generated at a boundary surface and a size of the remaining space is changed according to a degree of vacuum. However, the size is not reduced after a specific vacuum pressure, but only air in the remaining space disappears so that a vacuum state is formed.

Figure 7:
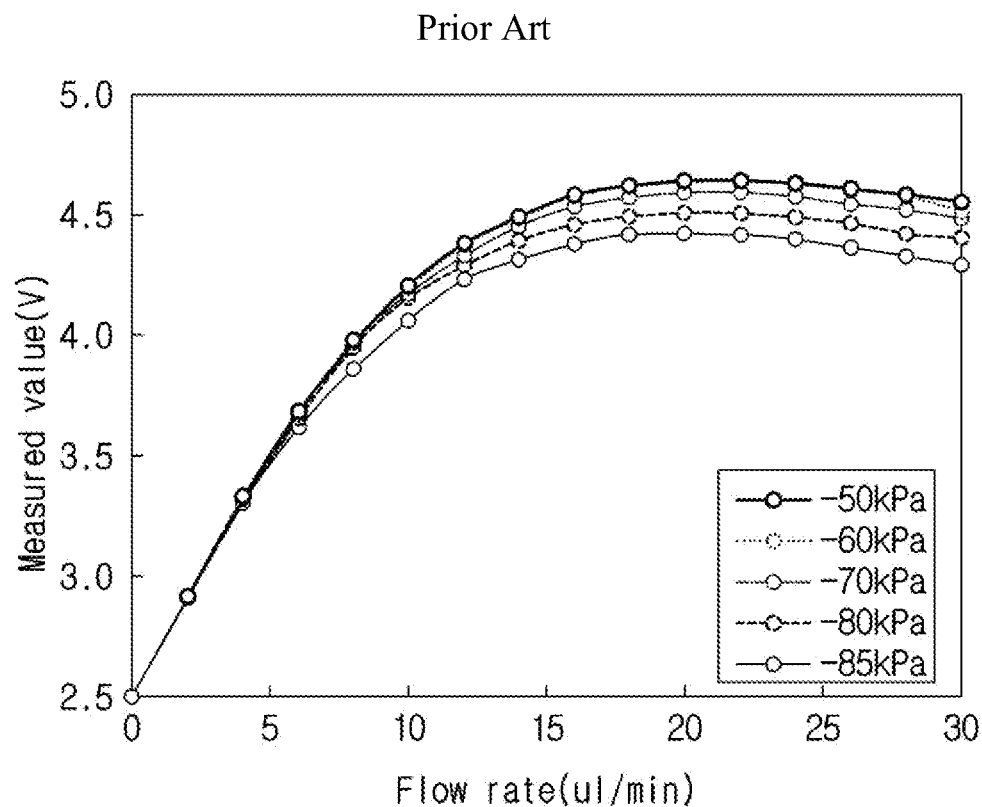
FIG. 7 is a graph illustrating a change of a measurement sensitivity according to a pressure in the related art of FIG. 6.

A disadvantage generated as a result is that as the intensity of the vacuum is increased, the size of the remaining space is not reduced, but the air in the remaining space disappears to be a vacuum state. Therefore, as illustrated in FIG. 6, there is no medium (air) which transmits heat generated in the heater to the fluid in the fluid channel so that as illustrated in FIG. 7, the sensitivity is degraded.

Figure 8:
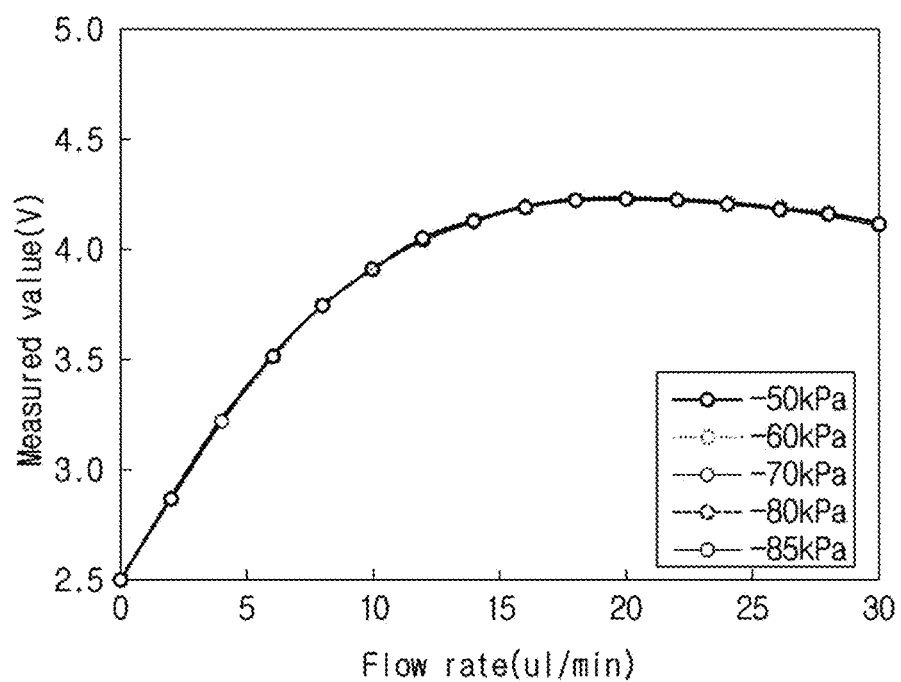
FIG. 8 is a graph illustrating a change of a measurement sensitivity according to a pressure in the present invention.

Accordingly, when the structure proposed by the present invention is used, as illustrated in FIG. 5, there is no remaining space between the heater and the measurement electrode and the ultra-thin film 300 of the second panel 300, so that there is no space which varies depending on the pressure. Therefore, the sensitivity for measuring a flow velocity does not vary in accordance with the change of the negative pressure as illustrated in FIG. 8.

Figure 9:
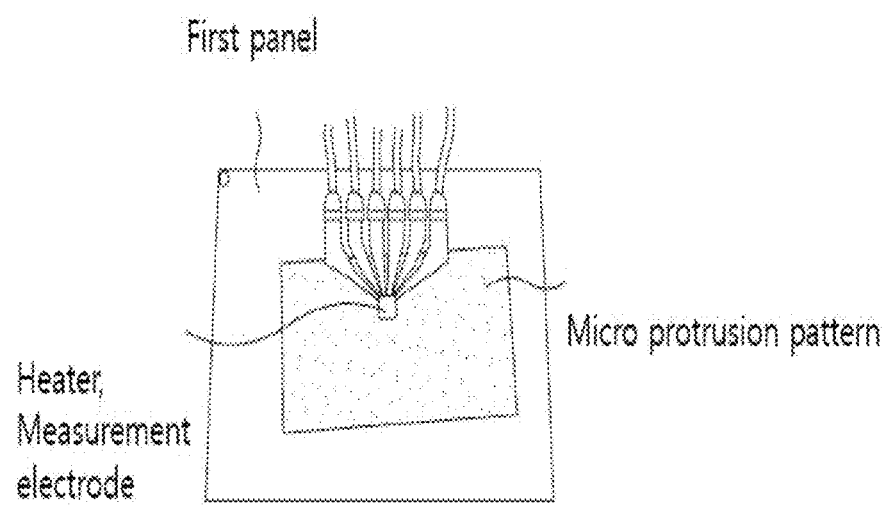
FIGS. 9 and 10 are photographs obtained by directly manufacturing an embodiment of the present invention.
Figure 10:
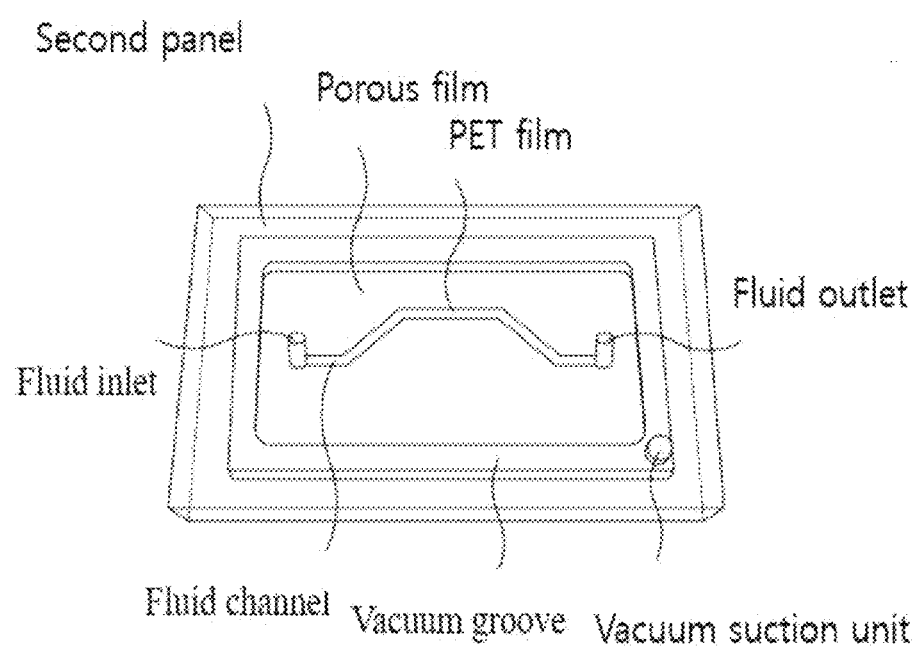

FIGS. 9 and 10 are photographs of the embodiment of the present invention which is actually manufactured. According to the flow velocity measuring device of the present invention, micro air bubbles in the fluid channel may be removed and a remaining space between the heater and the measurement electrode of the flow velocity measuring device and the ultra-thin film is not provided so that there is no space which is changed according to the pressure. Therefore, the sensitivity of measuring the flow velocity does not vary and the structure of the fluid channel is stably maintained regardless of the heat by the heater or the electrode.

Figure 11:
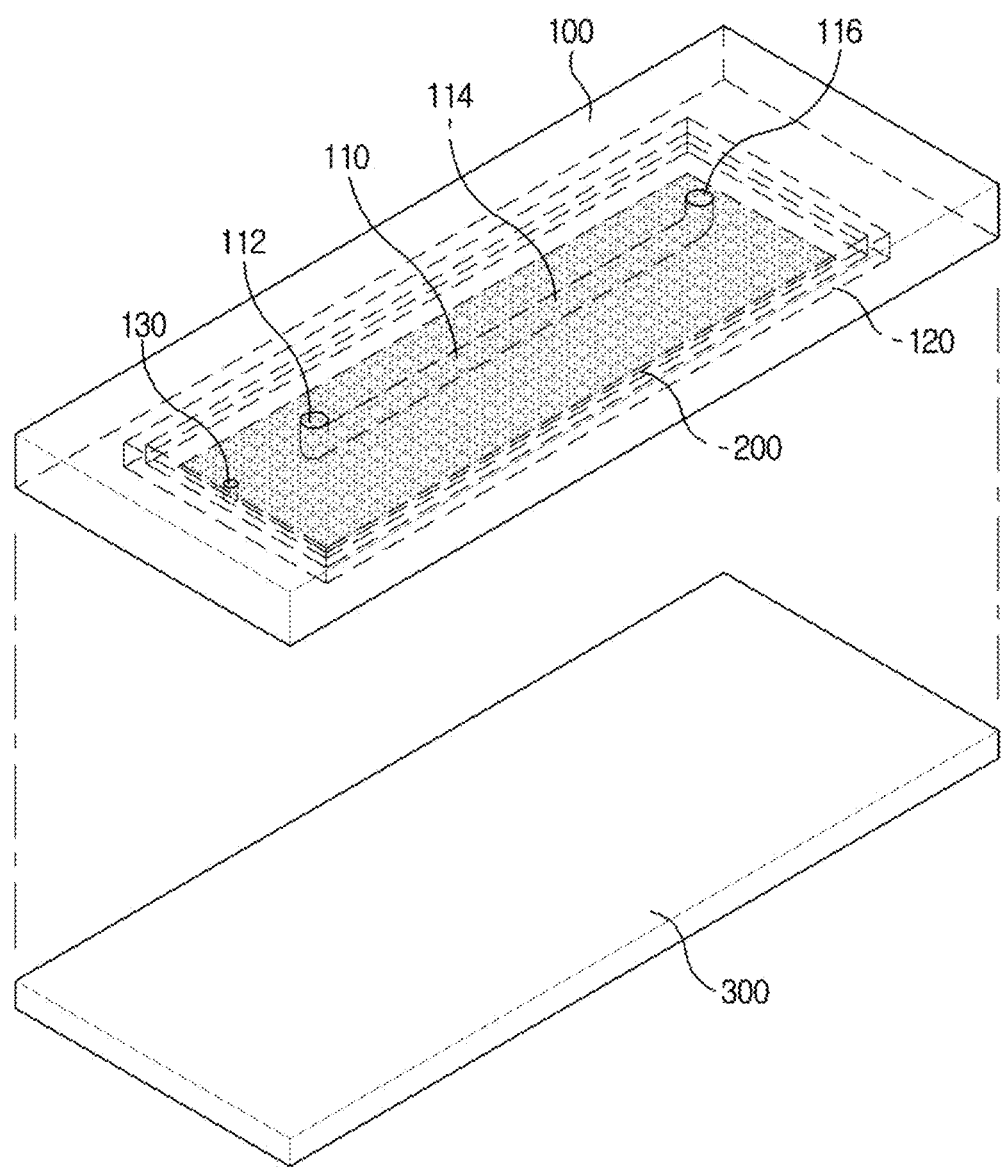
FIG. 11 is an exploded perspective view illustrating an embodiment of a microfluidic device of the present invention in which micro bubbles in a channel can be removed.
Figure 12:
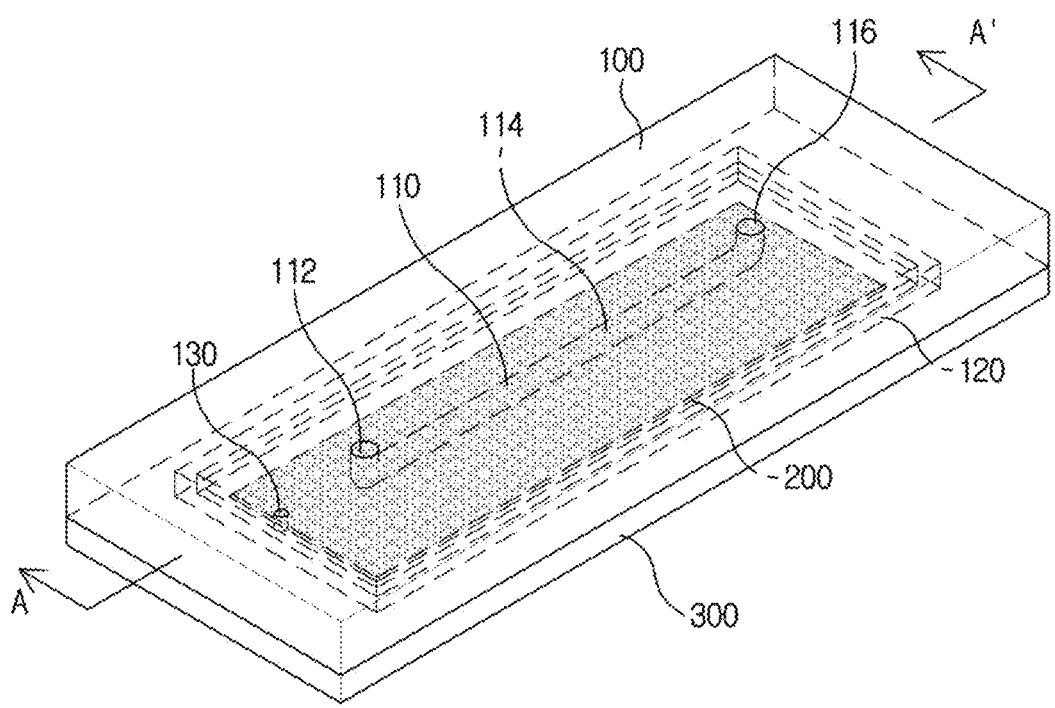
FIG. 12 is a combined perspective view of an embodiment illustrated in FIG. 11.
Figure 13:
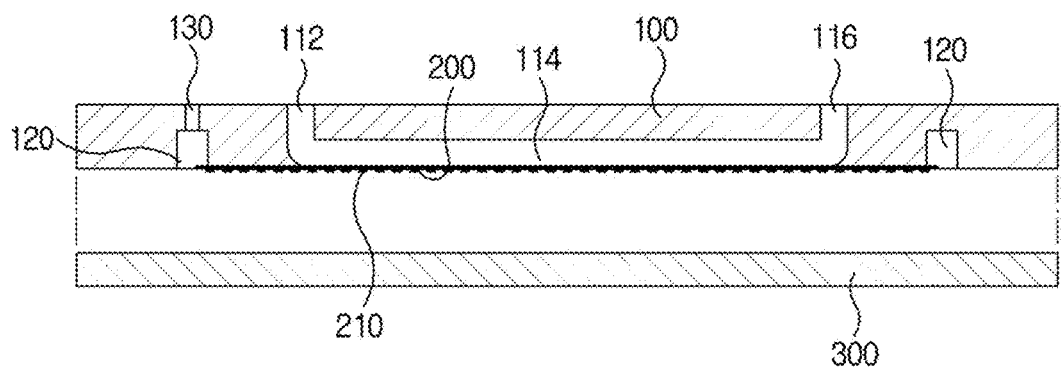
FIG. 13 is a cross-sectional view separately illustrating an upper panel and a lower panel of a microfluidic device of the present invention.
Figure 14:
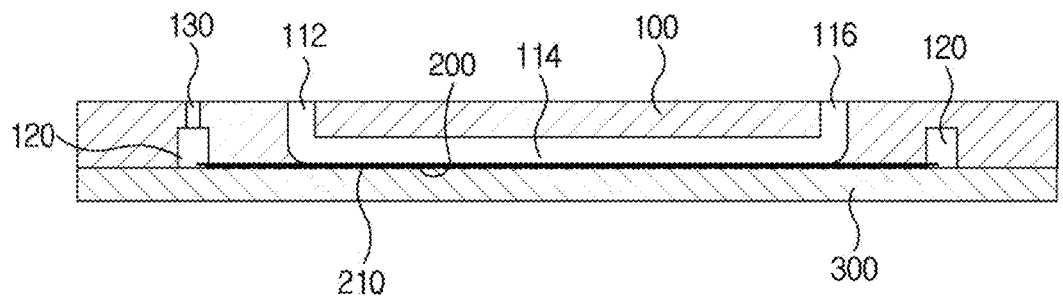
FIG. 14 is a cross-sectional view taken along the line A-A' of FIG. 12.

In the meantime, FIG. 11 is an exploded perspective view illustrating an embodiment of a microfluidic device of the present invention from which micro bubbles in a channel can be removed, FIG. 12 is a combined perspective view of an embodiment illustrated in FIG. 11, FIG. 13 is a cross-sectional view separately illustrating an upper panel and a lower panel of a microfluidic device of the present invention, and FIG. 14 is a cross-sectional view taken along the line A-A' of FIG. 12.

As illustrated in the drawings, a microfluidic device of the present invention mainly includes an upper panel 100, a porous ultra-thin film 200, and a lower panel 300.

The upper panel 100 includes a microfluidic channel 110 through which the fluid passes and is formed of a material such as silicon rubber (PDMS) or plastic.

The microfluidic channel 110 is a channel through which a fluid serving as a sample flows and includes a fluid inlet 112 into which the fluid is injected, a flow path 114 through which the fluid injected from the fluid inlet 122 flows, and a fluid outlet 116 from which the fluid flowing through the flow path 114 is discharged.

Here, the flow path 114 is formed on a lower surface of the upper panel 100 with a groove shape with a predetermined depth.

That is, the flow path 114 is formed on the lower surface of the upper panel 100 as a groove with a predetermined depth and the porous ultra-thin film 200 is attached onto a lower surface of the groove so that the flow path 114 through which the fluid flows is formed.

In the embodiment of the present invention, the fluid inlet 112 and the fluid outlet 116 are formed to communicate with an upper surface of the upper panel 100 and lower ends of the fluid inlet 112 and the fluid outlet 116 are connected by the fluid channel 114 so that the flow of the sample is performed with a shape of "U".

However, this is merely an embodiment of the present invention and the position where the fluid inlet 112 and the fluid outlet 116 are formed is not limited thereto.

That is, in some cases, the fluid inlet 112 and the fluid outlet 116 may be formed to communicate with the side surface of the upper panel 100 and the flow path 114 may also be formed with various shapes.

In other words, in the microfluidic device of the present invention, the flow path 114 of the microfluidic channel 110 is formed on the lower surface of the upper panel 100 as a groove with a predetermined depth and the porous ultra-thin film 200 is attached onto the lower surface of the groove.

By doing this, when the fluid flows through the microfluidic channel 110, the micro bubbles in the fluid are leaked through the porous ultra-thin film 200 and the shape of the flow path 114 and the position where the fluid inlet 112 and the fluid outlet 116 are formed may be applied in various ways.

In the meantime, the porous ultra-thin film 200 is attached onto a lower surface of the microfluidic channel 110 to remove micro air bubbles included in the fluid which passes through the microfluidic channel 110.

The porous ultra-thin film 200 has hydrophobicity so as not to pass the fluid flowing through the microfluidic channel 110 but pass only the micro bubbles included in the fluid to be leaked to the lower panel 300.

That is, when the fluid passes on the porous ultra-thin film 200 while flowing through the microfluidic channel 110, since the ultra-thin film 200 has hydrophobicity, the fluid flowing through the microfluidic channel 110 flows as it is without being leaked through pores of the porous ultra-thin film 200, in contrast, the micro bubbles in the fluid are leaked through the pores of the porous ultra-thin film 200 having a hydrophobicity.

In the present invention, the porous ultra-thin film 200 is formed of a hydrophobic material or may have hydrophobicity by processing the surface of the porous ultra-thin film 200 with a hydrophobic material.

As the porous ultra-thin film 200, various materials such as glass, polymer, or paper are applicable and for example, the porous ultra-thin film may include at least one material selected from the group consisting of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

The porous ultra-thin film 200 may mainly use a film in which nano-sized pores are formed in polymer (PET, PI, PP, PMMA, and the like).

In the present invention, the porous ultra-thin film 200 is integrated with the upper panel 100 and includes a support pattern 210 protruding to remove micro bubbles included in the fluid which passes through the microfluidic channel 110 in real time.

That is, in the present invention, the porous ultra-thin film 200 is attached and bonded to a lower portion of the upper panel 100 to be integrated.

The protruding support pattern 210 is formed on the lower portion of the porous ultra-thin film 200 to remove the micro bubbles included in the fluid which passes through the microfluidic channel 110 in real time.

When the support pattern 210 is bonded to the lower panel 300, a passage through which air is leaked is formed.

The protruding support pattern 210 may be simultaneously manufactured with the porous ultra-thin film 200 to be integrated by a processing process to be described below or may also be used to attach the protruding support pattern 210 which is separately processed to the porous ultra-thin film 200.

The support pattern 210 is formed on the surface of the porous ultra-thin film 200 with a height of several micrometers to form a space of several micrometers between the porous ultra-thin film 200 and the lower panel 300 and a passage through which micro bubbles passing through the porous ultra-thin film 200 are smoothly leaked to the outside is formed by means of this space.

The micro bubbles which are downwardly leaked through the porous ultra-thin film 200 come into contact with the surface of the lower panel 300.

The lower panel 300 serves as a substrate which bonds the upper panel 100 and is installed to be in contact with the lower surfaces of the upper panel 100 and the porous ultra-thin film 200 and is attached to the microfluidic channel 110 to which the porous ultra-thin film 200 is attached to discharge the micro bubbles leaked through the porous ultra-thin film 200 to the outside.

In order to attach the microfluidic channel 110 to which the porous ultra-thin film 200 is attached and the lower panel 300, the present invention includes a negative pressure forming unit which forms a negative pressure.

The negative pressure forming unit includes an air removal passage 120 formed on the lower surface of the upper panel 100 and a negative pressure applying hole 130 which communicates with the air removal passage 120 to apply a vacuum to the air removal passage 120 so that the microfluidic channel 110 to which the porous ultra-thin film 200 is attached is attached to the lower panel 300 in a vacuum state.

A vacuum pump (not illustrated) is connected to the negative pressure applying hole 130 so that when the vacuum pump operates, air of the air removal passage 120 is sucked through the negative pressure applying hole 130.

The air removal passage 120 is formed to enclose the microfluidic channel 110 and the porous ultra-thin film 200.

That is, as illustrated in FIG. 11, the air removal passage 120 may be desirably formed with a quadrangular shape to include all the areas where the microfluidic channel 110 and the porous ultra-thin film 200 are formed.

The negative pressure applying hole 130 is formed such that both ends communicate with the air removal passage 120 and an upper surface or a side surface of the upper panel 100.

The negative pressure applying hole is connected to an external device to apply a negative pressure to completely remove an air layer between the lower panel 300 and the upper panel 100 so that the lower panel 300 and the upper panel 100 are vacuum-adsorbed.

In the present invention, it has been illustrated that the negative pressure applying hole 130 is formed to communicate with the upper surface of the upper panel 100 in FIGS. 11 to 14.

However, the present invention is not limited thereto and the negative pressure applying hole 130 communicates with the side surface of the upper panel 100 to suck air in the air removal passage 120 through the negative pressure applying hole 130 at the outside.

The lower panel 300 and the channel 110 may be detachable by the air removal passage 120.

That is, when the negative pressure is applied to the air removal passage 120, the lower panel 300 and the channel 110 are attached by the vacuum and when the negative pressure applied to the air removal passage 120 is released, the lower panel 300 and the channel 110 are detached to be separated.

Figure 15:
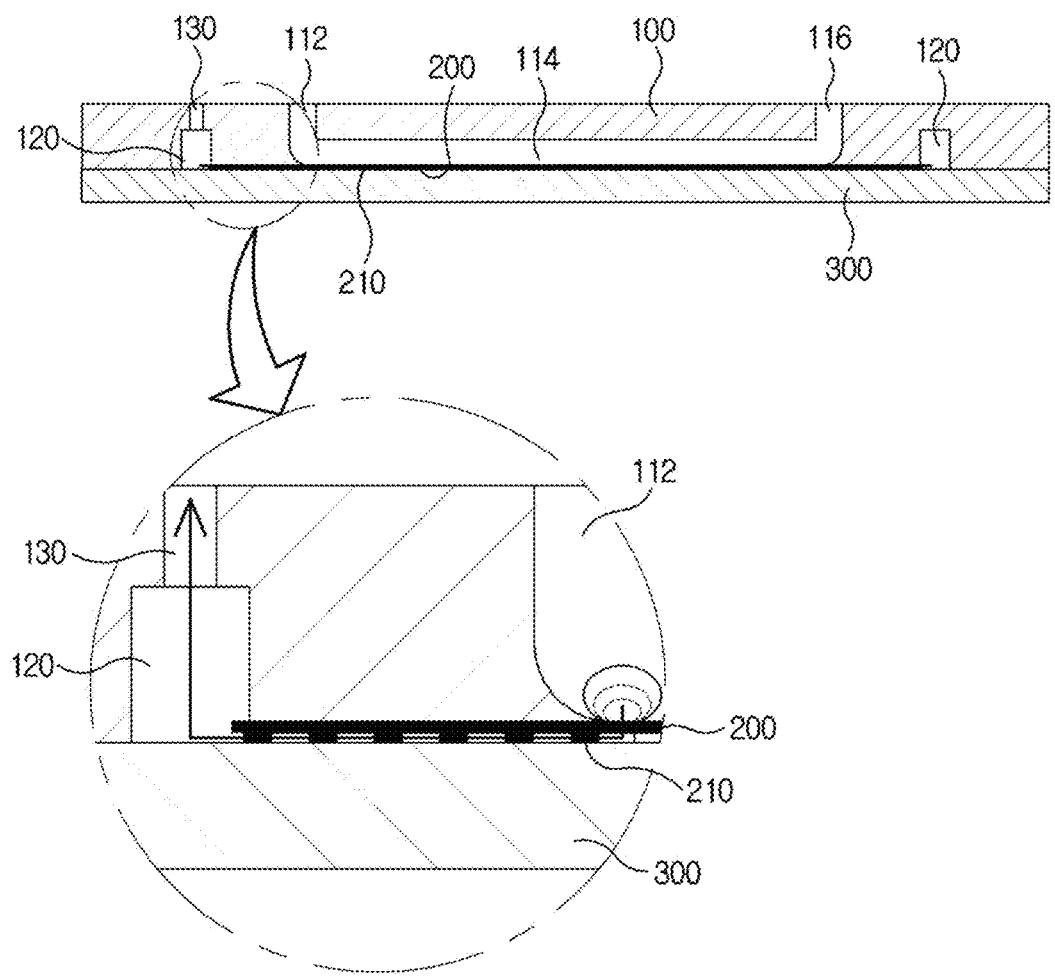
FIG. 15 is an enlarged cross-sectional view of a main part of a microfluidic device of the present invention.

FIG. 15 is an enlarged cross-sectional view of a main part of a microfluidic device of the present invention.

When the vacuum pump operates, the air of the air removal passage 120 is sucked through the negative pressure applying hole 130 and the negative pressure is formed in the air removal passage 120 which encloses the channel 110 not only to bond the upper panel 100 and the lower panel 300 but also to be formed between the protruding support patterns 210. That is, the negative pressure is formed below the porous ultra-thin film 200.

Accordingly, when micro bubbles or air is trapped in the channel 110, only air is leaked below the porous ultra-thin film 200 and the protruding support pattern 210 in real time and the micro bubbles leaked through the porous ultra-thin film 200 are gathered in a space formed by the support pattern 210 and then finally discharged to the air removal passage 120 in which the negative pressure is formed.

The support pattern 210 is formed on the surface of the porous ultra-thin film 200 with a height of several micrometers to form a space of several micrometers between the porous ultra-thin film 200 and the lower panel 300 and a passage through which micro bubbles passing through the porous ultra-thin film 200 are smoothly leaked to the outside is formed by means of this space.

In the meantime, the lower panel 300 may be a panel shape which does not have any function or may be a panel including a pattern with a specific function which provides a function such as a magnetic field, an electric field, or heat generation in the lower panel 300. Energy fields generated by the above-mentioned function pass through the porous ultra-thin film 200 to be transmitted to the channel.

Figure 16:
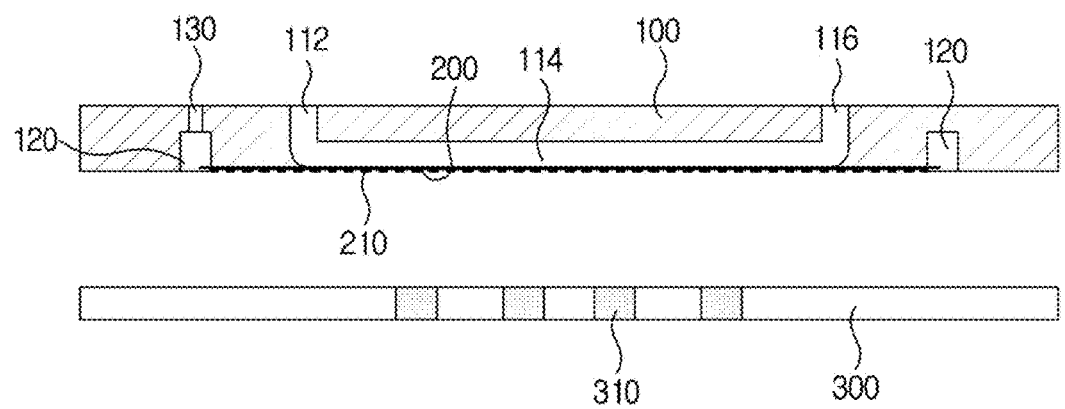
FIG. 16 is a cross-sectional view illustrating another embodiment of a microfluidic device of the present invention.

FIG. 16 is a cross-sectional view illustrating another embodiment of a microfluidic device of the present invention.

The lower panel 300 is provided to simply operate the device (bond the upper panel and the lower panel), but if necessary, may include a patterning 310 for a specific function of the device.

For example, an electric field, a magnetic field, heat, or the like may be generated depending on the type of patterning (a material or a pattern shape) to apply an energy to a fluid channel.

The energy is applied to perform a function for a specific purpose of the device. This is because the porous ultra-thin film 200 having a very small thickness and the protruding support pattern 210 are used so that energy generated in the lower panel 300 easily passes to be formed on the channel 110.

It may be confirmed that in the microfluidic device of the present invention with the above-described configuration, when fluid and gas are injected to the microfluidic channel 110 attached to the lower panel 300 with a predetermined interval, gas in the channel disappears and only the fluid flows.

A velocity at which the micro bubbles in the fluid are leaked may be adjusted according to a thickness of the porous ultra-thin film, a height of the pattern of the lower panel, an intensity of the vacuum applied to the air removal passage, and a size of a hole formed in the porous ultra-thin film.

Therefore, in order to quickly remove the micro bubbles in the fluid, the thickness of the porous ultra-thin film may be formed to be thin.

In addition, a velocity at which the micro bubbles in the fluid are leaked may be adjusted according to a thickness of the porous ultra-thin film, a height of the pattern of the lower panel, an intensity of the vacuum applied to the air removal passage, and a size of a hole formed in the porous ultra-thin film.

Figure 17:
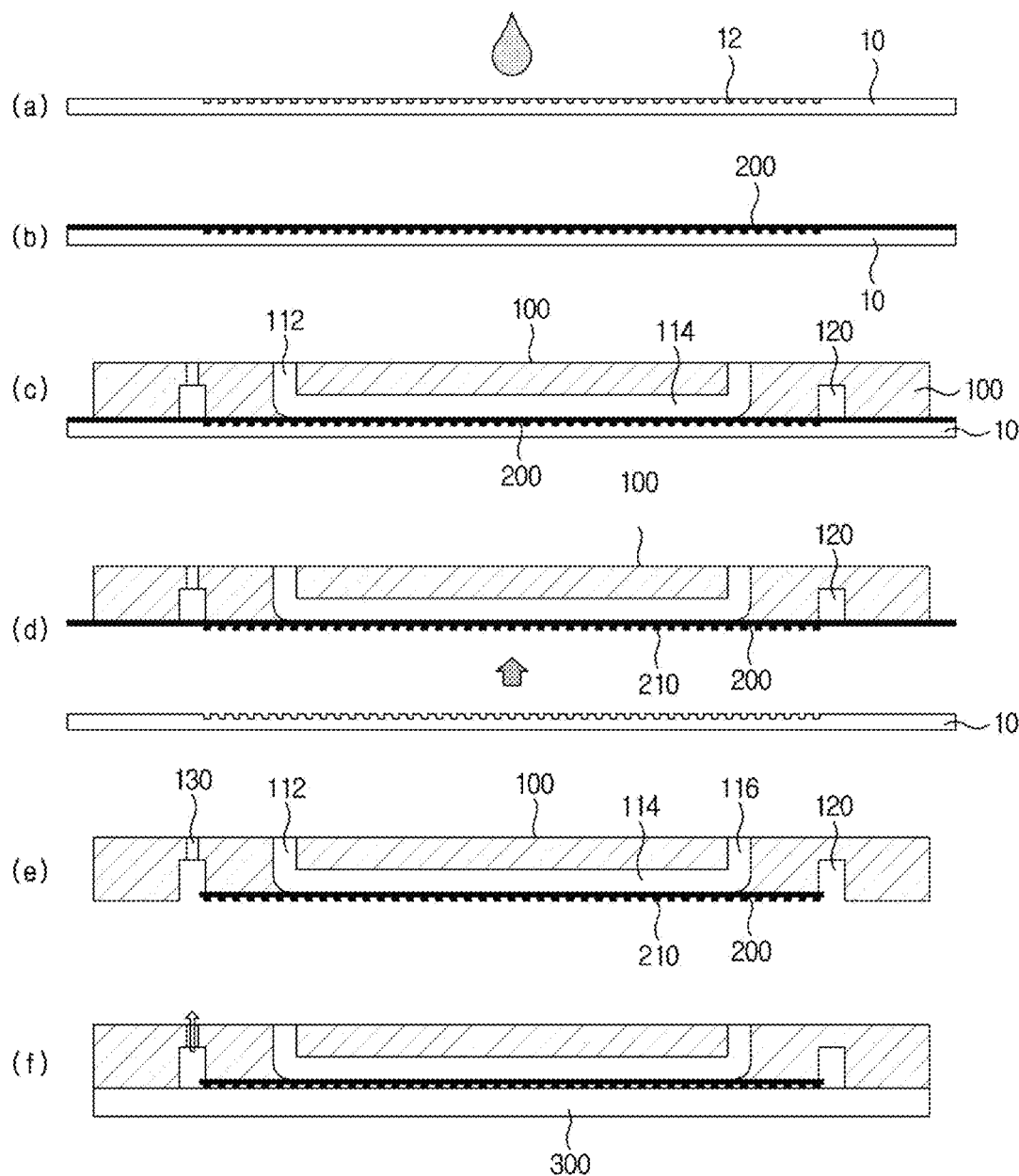
FIG. 17 is a cross-sectional view illustrating a process sequence of a manufacturing method of a microfluidic device of the present invention.

FIG. 17 is a cross-sectional view illustrating a process sequence of a manufacturing method of a microfluidic device of the present invention. The microfluidic device of the present invention may be manufactured according to a process sequence to be described below.

First, a mold 10 in which a support pattern 12 is patterned on one surface is prepared (see (a) of FIG. 17).

A liquid material for forming a porous ultra-thin film is poured into the mold on which the support pattern is formed.

Here, the material for forming the porous ultra-thin film may include at least one material selected from the group consisting of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

Thereafter, the material for forming a porous ultra-thin film poured into the mold 10 is subjected to a planarization process and then thermally treated to produce the porous ultra-thin film 200 ((b) of FIG. 7).

In this case, the planarization process makes the material very thin and flat by spin coating and flattening processes and the thermal treatment may be performed in the range of 65 to 110° C. for thirty minutes to one hour thirty minutes.

As a result of the experiment conducted by the applicant, the thermal treatment process for forming the porous ultra-thin film 200 is most desirably performed to be baked at 75° C. for one hour.

Next, the upper panel 100 in which the microfluidic channels 112, 114 and the air removal passage 120 are formed is attached onto the porous ultra-thin film 200 ((c) of FIG. 17).

Here, the porous ultra-thin film 200 and the upper panel 100 are attached by an oxygen plasma process and two minutes are taken for plasma treatment.

In a state in which the upper panel 100 and the porous ultra-thin film 200 are attached, thermal treatment is performed in a predetermined temperature range to bond the upper panel 100 and the porous ultra-thin film 200.

Also, in this case, the thermal treatment may be performed in the range of 65 to 110° C. for thirty minutes to one hour thirty minutes and most desirably, it is baked at 75° C. for one hour.

Next, the mold 10 is removed from the upper panel 100 to integrally form the porous ultra-thin film 200 with a support pattern on a lower portion of the microfluidic channel ((d) of FIG. 17).

As described above, when the mold 10 is removed from the upper panel 100, a protruding support pattern 210 formed with the porous ultra-thin film 200 is exposed on the lower portion of the microfluidic channel.

After removing an unnecessary part of the porous ultra-thin film 200 ((e) of FIG. 17, the upper panel 100 and the lower panel 300 are bonded using a negative pressure forming unit ((f) of FIG. 17).

The invention claimed is:

1. A disposable flow velocity measuring device, comprising:
   a first panel having a flow velocity measuring structure for measuring a flow velocity of fluid and having additional micro protrusion patterns around the flow velocity measuring structure;
   a second panel separated from the first panel and including a fluid channel through which a sample passes;
   a porous ultra-thin film formed on a portion at which the first panel and the second panel come in contact with each other so that the sample passing through the fluid channel does not directly come in contact with the flow velocity measuring structure to separate the first panel and the second panel and remove micro air bubbles included in the fluid passing through the fluid channel;
   a non-porous ultra-thin film formed in a partial region of the porous ultra-thin film; and
   a negative pressure forming unit which applies a negative pressure to adsorb the first panel and the second panel,
   wherein the flow velocity measuring structure includes: a heater which applies heats to a sample passing through the fluid channel; and
   two temperature measurement electrodes which are provided in upstream and downstream of the heater to measure a resistance difference according to a temperature change of the sample when the temperature of the sample rises due to the heat generated from the heater.

2. The disposable flow velocity measuring device of claim 1, wherein the non-porous ultra-thin film is installed so as to correspond to a position of the flow velocity measuring structure.

3. The disposable flow velocity measuring device of claim 2, wherein the non-porous ultra-thin film is installed on an upper portion of the porous ultra-thin film corresponding to the position of the flow velocity measuring structure to configure a two-layered ultra-thin film.

4. The disposable flow velocity measuring device of claim 3, wherein the micro protrusion pattern is omitted in the first panel corresponding to a position of the non-porous ultra-thin film.

5. The disposable flow velocity measuring device of claim 1, wherein the non-porous ultra-thin film includes at least one material selected from the group consisting of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

6. The disposable flow velocity measuring device of claim 1, wherein the micro protrusion patterns are formed to protrude on a surface of the first panel with a predetermined interval so as to prepare a passage for discharging micro air bubbles leaked through the porous ultra-thin film to the outside.

7. The disposable flow velocity measuring device of claim 6, wherein a height of the micro protrusion pattern is 3 to 7 μm.

8. The disposable flow velocity measuring device of claim 1, wherein the porous ultra-thin film has hydrophobicity so as not to pass the fluid flowing through the fluid channel but pass only the micro air bubbles included in the fluid to be leaked to the first panel.

9. The disposable flow velocity measuring device of claim 8, wherein the porous ultra-thin film includes at least one material selected from the group consisting of polydimethyl siloxane (PDMS), polyethylene terephthalate (PET), polyimide (PI), polypropylene (PP), poly(methyl methacrylate) (PMMA), polycaprolactone, polystyrene, propylene carbonate, ethylene carbonate, dimethylcarbonate, diethylcarbonate, polymer plastic, glass, paper, and ceramics.

10. The disposable flow velocity measuring device of claim 1, wherein the negative pressure forming unit includes a negative pressure forming groove formed on a surface where the first panel and the second panel come in contact with each other;
 a vacuum suction unit which communicates with the negative pressure forming groove to apply a negative pressure to adsorb the first panel and the second panel with the negative pressure so as to completely remove an air layer between the first panel and the second panel.

11. The disposable flow velocity measuring device of claim 10, wherein the negative pressure forming groove is formed on a lower surface of the second panel and
 the vacuum suction unit is formed to communicate with an upper surface or a side surface of the second panel.

12. The disposable flow velocity measuring device of claim 10, wherein the negative pressure forming groove is formed with a shape and in a position enclosing the fluid channel.

\* \* \* \* \*